March 31, 1925.  1,531,276
D. C. DAVIS
THRUST EQUALIZING MEANS FOR MULTIPLE COLLAR THRUST BEARINGS
Filed Oct. 6, 1922
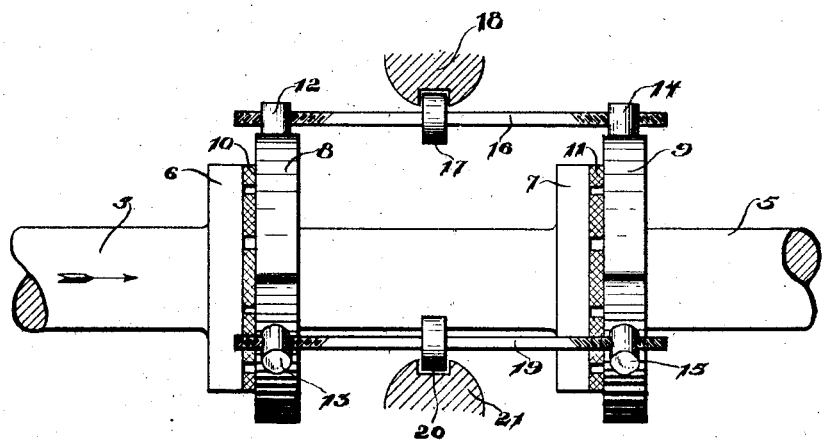
WITNESSES:
David C. Davis
INVENTOR Patented Mar. 31, 1925.

1,531,276

UNITED STATES PATENT OFFICE.

DAVID C. DAVIS, OF CHESTER, PENNSYLVANIA, ASSIGNOR TO WESTINGHOUSE ELECTRIC AND MANUFACTURING COMPANY, A CORPORATION OF PENNSYLVANIA.

THRUST-EQUALIZING MEANS FOR MULTIPLE-COLLAR THRUST BEARINGS.

Application filed October 6, 1922. Serial No. 592,883.

*To all whom it may concern:*

Be it known that I, DAVID C. DAVIS, a citizen of the United States, and a resident of Chester, in the county of Delaware and State of Pennsylvania, have invented a new and useful Improvement in Thrust-Equalizing Means for Multiple-Collar Thrust Bearings, of which the following is a specification.

My invention relates to thrust-equalizing or distributing means for thrust bearings of the multiple-collar type and it has for its object to provide apparatus of the character designated which shall be simple, compact, inexpensive and highly effective to perform the desired function.

Fig. 1 of the accompanying drawing is a side view, partially in section, of a device constructed in accordance with my invention.

In the operation of large thrust bearings, as are commonly employed, for example, on the propeller shafts of ships, it is found difficult or impossible to impose the entire thrust upon a single thrust collar and accordingly, means have been proposed for distributing this thrust among a plurality of thrust-receiving collars. Apparatus of this character has been open to the objection that it has hitherto been found extremely difficult to properly divide the load among the respective collars, elaborate system of equalizing levers having been proposed but not proving successful in all cases.

In accordance with the present invention, I provide a shaft from which a thrust is to be derived with, for example, two thrust flanges and a substantially fixed thrust collar is arranged to bear against each of said flanges, respectively. Each of said collars is provided with a plurality of threaded openings therein or in lugs mounted thereupon and longitudinal members are provided, each in threaded engagement with an opening in each of the said collars, respectively. The engagement at one end of each of said members is with a right-hand thread and at the other end with a left-hand thread and means are further provided for preventing longitudinal movement of said longitudinal members. By this means the thrust transmitted by one collar to one of said longitudinal members tends to cause rotation thereof in one direction and the thrust transmitted from the other of said collars to said member tends to cause rotation thereof in the opposite direction, with the result that the rotative torques are equalized as well as the thrust assumed by the respective collars.

Referring to the drawing for a more detailed understanding of my invention I show a shaft at 5—5 which transmits a thrust in the direction indicated by the arrow 6. The shaft 5 carries thrust flanges 6 and 7 which bear against substantially fixed thrust collars 8 and 9, respectively.

I have shown the thrust collars 8 and 9 as provided with tilting bearing shoes 10 and 11 of the well-known Kingsbury type, as is well understood in the art, although this feature forms no part of the present invention.

The collar 8 is provided with spaced peripheral lugs 12 and 13 and the collar 9 is similarly provided with lugs 14 and 15. In the structure shown, these lugs are disposed substantially 120° apart on the peripheries of the respective thrust collars and a similar lug is provided at the back of each collar (not shown).

The lug 12 is provided with an opening therethrough having a left-hand thread and similarly the lug 14 is provided with an opening therethrough having a right-hand thread and a suitable rod or strut 16 engages said threaded openings, being provided with corresponding threads. Preferably these threads are of relatively steep pitch and may be triple or quadruple threads having a pitch angle up to 45° for a purpose to be hereinafter more fully pointed out.

The member 16 is restrained from longitudinal movement as by the engagement of a flange 17 thereon with a fixed member 18.

Similarly the lugs 13 and 15 are connected by a member 19 having a flange 20 restrained by a member 21 and likewise the lugs at the back of the structure shown are provided with interconnection.

Having thus described the arrangement of apparatus embodying my invention, the operation thereof is as follows: Let it be assumed that the thrust assumed by the collar 8 exceeds that assumed by the collar 9 and that it be desired to equalize these two derived thrusts. The tendency of the member 8 to move toward the right under its excessive thrust tends to cause rotation of the member 16 in a clockwise direction as viewed from the left-hand end thereof. This action is opposed by the tendency of the lug 14 to rotate the member 16 in a counterclockwise direction under the influence of the minor thrust assumed by the collar 9, but inasmuch as the torque developed on the member 16 in the lug 12 exceeds the torque developed at the lug 14, the member 16 rotates slightly in a clockwise direction, drawing forward the collar 9 to a slight amount and causing said collar to assume a greater proportion of the load, the collar 8 being at the same time relieved to a certain extent.

The flange 17, while free to rotate in the member 18, nevertheless transmits thereto all thrust received from the lugs 12 and 14, the left-hand end of the member 16 being in compression and the right-hand end thereof being in tension.

From the foregoing description, it will be noted that I have provided a relatively simple, compact and inexpensive structure which shall be highly effective to at all times maintain the relative thrust assumed by the collars 8 and 9 in any predetermined relation. If the pitch of the threads at each end of the members 16, 19, etc., is the same, the tendency will be for equalization of the thrusts on the two thrust collars but if the pitch angle of the thread at one end differs from that of the thread at the other end of a given longitudinal member, the thrusts assumed by the collars 8 and 9 may be caused to bear any desired relative ratio.

While I have described my structure as employing but three pairs of lugs and three longitudinal members, because of the well-known equalized tendency therebetween similar to that in the well-known three-point suspension, it will be obvious that I may, if desired, employ a still greater number of said members.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. The combination with a member subject to a thrust in a given direction, of means for taking said thrust from said member at two points comprising two members in engagement therewith, a member in threaded engagement with each of said members, respectively, said threaded engagement being such that opposed torques are transmitted thereby to said last-named member, and means for restraining said last-named member from movement in the direction of said thrust.

2. The combination with a shaft subject to a thrust in a given direction, of a pair of flanges thereon, a pair of substantially fixed collars encircling said shaft, said collars being positioned to receive thrusts from said flanges, respectively, a plurality of longitudinal members, each in threaded engagement with one of said collars with a right-hand thread and in threaded engagement with the other of said collars with a left-hand thread, and means for restraining said longitudinal members from longitudinal movement.

3. In a multiple-collar thrust bearing, the combination with a pair of substantially fixed thrust-receiving collars, of a member extending substantially parallel to the longitudinal axis of the bearing and engaging one of said collars with a right-hand thread and the other of said collars with a left-hand thread, and means for restraining said member from longitudinal movement.

4. In a multiple collar thrust bearing, the combination with two thrust receiving collars, of thrust equalizing means deriving a torque from one of said collars, and thrust equalizing means deriving a torque from the other of said collars for opposing the torque derived from the first collar.

5. In a multiple collar thrust bearing, the combination with two thrust receiving collars, of thrust equalizing means for deriving a torque from one of said collars about an axis parallel to the longitudinal axis of said bearing, thrust equalizing means for deriving a similar torque, but in the opposite direction, from the other of said collars, and shaft means for receiving both torques, whereby they are caused to oppose each other.

6. In a multiple collar thrust bearing, the combination with a pair of substantially fixed collars for receiving thrust, of an equalizing member so connected to each of said collars that the exertion of unequal thrusts thereupon creates tendencies to rotate the equalizing member in opposing directions, and means for restraining the longitudinal movement of the equalizing member.

In testimony whereof, I have hereunto subscribed my name this 29 day of Sept., 1922.

DAVID C. DAVIS.